Figures 1, 2:
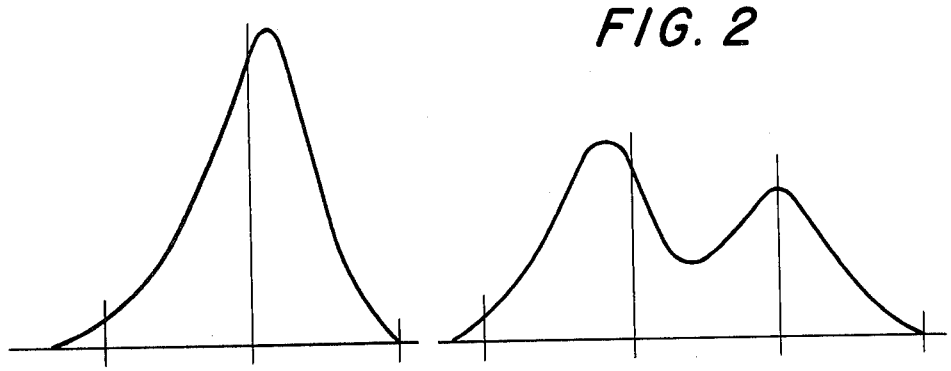

United States Patent [19]

de Zarauz

[11] 4,078,131

[45] Mar. 7, 1978

[54] EPT ELASTOMERS

[75] Inventor: Yves de Zarauz, Le Cendre, France

[73] Assignee: Compagnie Generale des Etablissements Michelin, France

[21] Appl. No.: 712,338

[22] Filed: Aug. 6, 1976

[30] Foreign Application Priority Data

Sep. 2, 1975  France .............................. 75 27073

[51] Int. Cl.$^2$ ...................... C08C 19/20; C08F 210/18
[52] U.S. Cl. .................................. 526/20; 260/897 A; 526/65; 526/66; 526/143; 526/169; 526/336
[58] Field of Search ...................... 526/20, 65, 66, 143, 526/169, 336; 260/897 A

[56] References Cited

U.S. PATENT DOCUMENTS 3,718,632  2/1973  Gardner et al. ........................ 526/65

OTHER PUBLICATIONS

"Copolymerization," Ed. by G. E. Ham, Interscience, New York (1964), pp. 264–273.

Primary Examiner—Alan Holler
Attorney, Agent, or Firm—Brumbaugh, Graves, Donohue & Raymond

[57] ABSTRACT

Elastomers of the ethylene-propylene-termonomer type.

In accordance with the invention these elastomers have a bimodal distribution of the molecular weights, each principal fraction having, on the one hand, a wide distribution of the molecular weights and a monomer composition which is different from that of the other principal fraction, but, on the other hand, a distribution of composition as a function of the molecular weights which is very narrow around the average value contemplated for the fraction.

7 Claims, 3 Drawing Figures

EPT ELASTOMERS

The present invention relates to elastomers of the ethylene-propylene-termonomer type which form vulcanizable mixes having improved raw adhesive power and raw cohesion, as well as to pneumatic tires made with such elastomers.

Elastomers of the ethylene-propylene-termonomer type, also known under the designation "E.P.T." or "E.P.D.M.", are, as is known, copolymers of ethylene, propylene, and a non-conjugated diene. The purpose of the non-conjugated diene is to introduce unsaturations which make the elastomers of the ethylene-propylene type vulcanizable with sulfur.

These elastomers of the ethylene-propylene-termonomer type have certain advantages over the ordinary diene rubbers. First of all, they are obtained from raw materials — ethylene and propylene — which are less expensive than butadiene and styrene. Second of all, these elastomers, due to their low rate of unsaturation and the position of the unsaturations with respect to the chain, have very good resistance to aging and excellent resistance to oxidation, particularly by ozone. Therefore, their use in rubber making, and particularly in pneumatic tires, may be of definite interest. While these elastomers have satisfactory general properties as compared with the properties of the customary diene elastomers, or properties even superior in the case of some of them, the E.P.T.s have a serious disadvantage which has limited their scope of use up to the present time, namely they form vulcanizable mixes having a poor compromise between raw adhesive power and raw cohesion, which makes the E.P.T.s unusable as the principal component of vulcanizable mixes serving for the manufacture of pneumatic tires or other composite rubber articles.

By "raw adhesive power" there is understood the ability of the two surfaces of a given unvulcanized elastomer mix to adhere to each other under a slight contact pressure.

By "raw cohesion" there is understood the ability of a sample of unvulcanized elastomer mix to withstand deformation when subjected to stresses.

Due to the poor level of the compromise between the raw adhesive power and the raw cohesion of the vulcanizable E.P.T. mixes, on the one hand, it is extremely difficult and very expensive to manufacture the different unvulcanized components having a base of elastomers of the ethylene-propylenetermonomer type entering into the manufacture of the composite articles, and in particular tires, and these components do not remain joined or welded to each other, while, on the other hand, these rubber articles, and in particular unvulcanized tires, are very difficult to handle and store, since they very rapidly lose the shape which has been imparted to them upon their manufacture. Up to now this has considerably reduced their range of use and has prevented the profitable manufacture on an industrial scale of composite articles of rubber and particularly pneumatic tires. Thus, the major problem which arises upon the use of elastomers of the E.P.T. type relates to the raw adhesive power and the raw cohesion of the vulcanizable mixes.

In order that elastomers of the ethylene-propylenetermonomer type can be used as the principal component of mixes serving for the manufacture of composite rubber articles, and in particular pneumatic tires, it is necessary for the mixes to have a good compromise between raw adhesive power and raw cohesion. In other words, they must, on the one hand, have fluidity which permits the formation of a joint (weld) by superficial interpenetration of the contacting surfaces of the different portions of the unvulcanized composite articles of rubber, and, on the other hand, sufficient cohesion to:

(a) permit the industrial manufacture of the different components, (b) hold the different parts adhering together to each other, (c) prevent the opening of the joints or welds formed by the different components or oppose the deforming of the manufactured articles upon their handling or storage before vulcanization.

Various means have already been proposed for avoiding the drawbacks which arise upon the use of elastomers of the E.P.T. type. Thus, there has been unsuccessfully proposed the use of mixes having a base of elastomers of the ethylene-propylene-termonomer type containing, furthermore, diene rubbers, and in particular natural rubber, or else of adhesive or reinforcing phenolic resins, as for instance in German Unexamined Application for U.S. Pat. No. 2,246,704. For the same purpose, it has also been proposed to add a certain amount of polyene to the elastomer of the E.P.T. type or to produce a mix having a base of two elastomers of the E.P.T. type, each containing a certain amount of ethylene, propylene, and conjugated diene and also containing a polyene (U.S. Pat. No. 3,468,979).

However, the products thus obtained, depending on the propylene content of the two elastomers, either do not have a sufficiently high raw cohesion or have too high a crystalline character to permit their satisfactory use in the manufacture of composite rubber articles and in particular of pneumatic tires.

The present invention remedies the above-mentioned drawbacks by using, for the manufacture of composite rubber articles, new elastomers of the ethylene-propylene-termonomer type which provide mixes having a compromise between raw adhesive power and raw cohesion which is very substantially improved over the known mixes of elastomers of this type, and which new elastomers are capable of being actually usable as the principal component of mixes serving for the manufacture of composite rubber articles, and particularly pneumatic tires. These new elastomers do not require the addition of any agent other than the conventional additives (carbon black, vulcanizing agents, etc.) customarily employed in the manufacture of tires. In particular, they do not require adhesive agents which always slow down the rate of vulcanization and produce vulcanized products having poor mechanical properties. Nor do they require less favorable conditions of operation, for instance an excessively long period of vulcanization, and they make it possible to obtain mixes having a raw cohesion and a raw adhesive power sufficient to permit the industrial manufacture of composite rubber articles, for instance pneumatic tires.

The present invention furnishes elastomers of the ethylene-propylene-termonomer type which are characterized (1) by the fact that the termonomer is a linear non-conjugated diene, (2) by the fact that they have a bimodal distribution of the molecular weights, each principal fraction having, on the one hand, a wide distribution of the molecular weights and a monomer composition different from that of the other principal fraction, but, on the other hand, a distribution of composition as a function of the molecular weights which is very narrow around the average value contemplated for the fraction, and (3) by the fact that they are formed of: (a) a first principal fraction comprising from about 30% to about 85% (by weight, referred to the total weight of elastomers) of molecular fractions having:

an intrinsic viscosity distribution extending from about 0.2 to about 3, an average intrinsic viscosity between about 0.8 and about 1.5, an average propylene content of between about 36% and about 52% (by weight), and a termonomer content of between about 0% and about 5% (by weight), and of (b) a second principal fraction comprising from about 70% to about 15% (by weight, referred to the total weight of elastomers) of molecular fractions having:

an intrinsic viscosity distribution extending from about 3 to about 15, an average intrinsic viscosity between about 3.5 and about 7, an average propylene content of between about 26% and about 32% (by weight), and a termonomer content of between about 0% and about 5% (by weight), less than about 5% (by weight, referred to the total weight of elastomer) of molecular fractions having a propylene content of less than about 25% (by weight) and a crystallization temperature of more than 35° C.

Another object of the invention is the use of these elastomers in vulcanizable mixes containing vulcanization agents, plasticizers, etc. customarily employed in the manufacture of different elements constituting pneumatic tires.

The elastomers in accordance with the invention are characterized by the fact that they have a wide bimodal distribution of the molecular weights, as well as a very narrow bimodal composition distribution as a function of the molecular weights, that is to say the first principal fraction of low molecular weight is rich in propylene and the second principal fraction of high molecular weight has a propylene content less than that of the first principal fraction of low molecular weight, each of these two principal fractions having a different composition of ehtylene and propylene but a very narrow distribution ($\pm$ 2%) around the average value contemplated for each fraction. They are furthermore characterized by the fact that they have fractions of very high molecular weight and that they have less than about 5% or less than about 3% or even 0% (by weight, referred to the total weight of elastomers) of molecular fractions having a propylene content of less than about 25% (by weight), that is to say too rich in ethylene.

These elastomers have a total average content of propylene of between about 30% and about 50% (by weight) and preferably between 34% and 43%, and a Mooney ML (1 + 4) plasticity at 130° C. of between 15 and 120, and preferably between 20 and 70.

These elastomers form unvulcanized mixes which possess a definitely improved compromise between raw adhesive power and raw cohesion. Thus, the elastomers of the ethylene-propylene-termonomer type in accordance with the invention, which are normally filled with carbon black and oil, form unvulcanized mixes which present a compromise between raw adhesive power and raw cohesion which is 100% to 200% better than that of the previously known unvulcanized mixes of elastomers of the ethylene-propylene-termonomer type. This compromise reaches the value required for the assembling of the layers of unvulcanized elastomer mixes in the manufacture of conveyor belts, pneumatic tires, etc. This improvement has the result that the elastomers in accordance with the invention can be used as the principal component of mixes serving for the manufacture of composite rubber articles, in particular of pneumatic tires. These elastomers, which are normally filled with carbon black and oil and contain all the ingredients customary in the manufacture of tires, such as plasticizers, vulcanization agents, etc., have sufficient properties after vulcanization that they can be used in tires and, in particular, as calandering rubber for cord plies, sidewall rubber and thread rubber.

This improved compromise between the raw adhesive power and the raw cohesion of the unvulcanized mixes of elastomers in accordance with the invention is less sensitive to relative variations of the first principal fraction of low molecular weight, that is to say that having an intrinsic viscosity distribution extending from about 0.2 to about 3, and of the second principal fraction of high molecular weight, that is to say that having an intrinsic viscosity distribution extending from about 3 to about 15.

In order for the elastomers of E.P.T. type in accordance with the invention to provide unvulcanized mixes having improved level of raw adhesive power and raw cohesion, it is necessary that the second principal fraction of high molecular weight have an average propylene content of between about 26% and about 32% (by weight) and it is furthermore necessary that there are no or only very few (less than 5% or less than 3% by weight, referred to the total weight of elastomers) fractions having a propylene content of less than 25% (by weight), since otherwise the elastomers have fractions which are too rich in ethylene which impart to them too marked a crystalline character, which is very harmful to the raw adhesive power of the unvulcanized mixes.

In order for the elastomers in accordance with the invention to provide unvulcanized mixes having improved level of raw cohesion, it is necessary that the propylene content of the second principal fraction of high molecular weight not exceed about 32% (by weight). As a matter of fact, if the ethylene content of the elastomers is too low, the unvulcanized elastomer mixes no longer reach this improved level of raw cohesion.

Elastomers in accordance with the invention may be prepared by conventional methods of polymerization at a temperature between $-20°$ and 80° C., and preferably between 0° and 60° C., at a pressure between 0 and 50 kg/cm$^2$, for instance, by a continuous polymerization process in solution or in suspension, in one or more reactors in cascade. One may use aliphatic organic solvents (hexane, heptane, etc.), cycloaliphatic organic solvents (cyclohexane, etc.), aromatic organic solvents (toluene, benzene), or their halogenated derivatives.

As catalysts there are particularly suitable systems containing:

(a) an organic or inorganic compound of a transition metal of Groups 4A to 8A of the Mendeleev periodic table of elements and preferably the derivatives of vanadium, such as the halogenated derivatives, for instance, VOCl$_3$, VCl$_4$, the esters, for instance VO(OC$_3$H$_7$)$_3$, VO(O isopropyl)$_3$, the acetyl acetonates, for instance, vanadium triacetyl acetonate, vanadium oxide diacetylacetonate, vanadium oxydichloride acetylacetonate, etc.

(b) an organoaluminum compound or mixture of compounds, whether halogenated or not, and preferably the aluminum alkyls such as $Al(C_2H_5)_3$, $Al(iso\text{-}C_4H_9)_3$, aluminum alkyl monohalides such as $BrAl(C_2H_5)_2$, $ClAl(C_2H_5)_2$, $ClAl(iso\text{-}C_4H_9)_2$ etc., the aluminum alkyl dihalides such as $Cl_2AlC_2H_5$, $Cl_2Al\ iso\text{-}C_4H_9$, $Br_2AlC_2H_5$ etc., the alkyl aluminum sesquichlorides such as $Cl_3Al_2(C_2H_5)_3$, $Cl_3Al_2(CH_3)_3$, $Br_3Al_2(C_2H_5)_3$, etc.

(c) and possibly one or more molecular weight regulating or transfer agents such as diethyl zinc or hydrogen, or electron donors such as esters, ether oxides or amines, or activators such as trichloracetic acid or trifluoracetic acid esters or maleic anhydride, or halogenated organic or inorganic derivatives such as for instance hexachlorocyclopentadiene, hexachloroprene, hexachloroacetone, diphenyldichlorphosphine, etc. By way of example, the following catalytic combinations can be used:

$VOCl_3$—$Cl_2AlC_2H_5$, $VCl_4$—$Cl_3Al_2(C_2H_5)_3$,
$VOCl_3$—$Cl_3Al_2(C_2H_5)_3$—$H_2$—$CCl_3COOC_2H_5$,
$VCl_4$—$Cl_3Al_2(C_2H_5)_3$—$H_2$—$CCl_3COOC_2H_5$,
$VCl_4$—$ClAl(C_2H_5)_2$,
$VO(OC_4H_9)_3$—$Cl_3Al_2(C_2H_5)_3$.

As termonomer, linear polyenes are suitable, and among the latter, in particular, the aliphatic acyclic diolefins having 5 to 18 carbon atoms in which the double bonds are separated by more than two carbon atoms and of which at least one of the two double bonds is located at the end of the hydrocarbon chain. By way of example, one may use octadiene-1,4, octadiene-1,5, hexadiene-1,4, heptadiene-1,4, heptadiene-1,5, etc.

In all the examples which follow, the compositions of the elastomers in accordance with the invention were determined by infrared spectography or by nuclear magnetic resonance; the distributions of the molecular weights were obtained either by chromatography by permeation on gel at 80° C. by means of trichlorobenzene as solvent or by column elution at 20° C. with the use of a cyclohexane-acetone mixture having a cyclohexane concentration of between 63% and 75%; the intrinsic viscosity was determined at 30° C. in cyclohexane.

The percentage of fractions having a propylene content of less than about 25% (by weight) was determined by the amount of insoluble matter. The latter was determined by preparing, by molding at 100° C. under a pressure of 400 kg/cm² for 1 minute, a slab of unvulcanized elastomer of a thickness of 1 mm. from which there were taken cubic samples of 1 mm³. One gram of the elastomer prepared in this manner was placed in solution in 200 cc. of heptane (solvent) 12 hours after molding. The solution was agitated for 8 hours at room temperature (20°–23° C.). The solution was then filtered and the residue dried at 80° C. under a partial pressure of 200 mm. of mercury. Thereupon this residue was weighed and its composition was analyzed to determine the amount of insoluble matter, expressed in percentage by weight of the elastomer.

The crystallization temperature was determined by differential calorimetric analysis on a DuPont 900 apparatus with D.S.C. cell. The inherent viscosities were determined in tetrachlorethylene at 30° C. at a concentration of 0.1 g. in 100 cc. The intrinsic viscosities were determined in cyclohexane at 30° C.

The measurement of the raw cohesion was effected on "dumbbell" test pieces of a thickness of 2.5 mm. obtained by molding effected under a pressure of 15 tons at a temperature of 110° C. for 10 minutes. The measurement was effected by means of an "Instron" electronic dynamometer 24 hours after molding, and with a rate of pulling of 10 cm. per minute.

The measurement of the raw adhesive power was effected on parallelepiped test pieces of a length of 100 mm., a width of 10 mm. and a thickness of 2.2 mm. obtained by molding a layer of elastomer under a pressure of 15 tons at 110° C. for 10 minutes. Two of these test pieces were assembled perpendicularly (contact surface 1 cm²) and subjected to a pressure of 1 kg/cm² for one minute. After a period of relaxation of 5 minutes, the tearingapart force of the test pieces was determined with a rate of pulling of 50 cm/minute by means of an "Instron" electronic dynamometer.

The invention is illustrated by the following nonlimitative examples.

EXAMPLE 1

The object of this control or comparative example is to show that the elastomers having a monomodal molecular weight distribution form unvulcanized mixes having a low raw adhesive power (that is to say less than 700 g/cm²) whatever the raw cohesion and the molecular weight of the elastomer. Several tests were carried out; the polymerizations were effected continuously in an 8 liter stainless steel reactor under a pressure of 6 kg/cm² while maintaining constant the rates of flow in liters/hour of the monomers introduced in gaseous form and under the conditions appearing in Table 1A below.

The elastomers obtained have the characteristics set forth in Table 1B below.

From FIG. 1, it can be noted that the distribution of the molecular weights of the elastomers is monomodal.

From these terpolymers, vulcanizable mixes were prepared in accordance with the following formulation (parts by weight):

polymer: 100; FEF black: 70; paraffin oil: 50; ZnO: 5; stearic acid: 1.5; sulfur: 1.5; tetraethyl thiuram disulfide: 1.5; mercaptobenzothiazole: 0.5. The raw adhesive power and the raw cohesion of these mixes are set forth in Table 1C below.

It is noted that the raw adhesive power of the mixes having a base of elastomers with monomodal distribution is low, whatever their crystalline character (determined by the crystallization temperature) and their Mooney plasticity.

EXAMPLE 2

The object of this control or comparative example is to show that the level of raw adhesive power of mixes of the E.P.T.s is improved by having a wide bimodal distribution of their molecular weights (as compared with the polymers described in Example 1), but that the level of raw adhesive power reached is sensitive to the content of the polymer of crystalline fractions having a composition of less than 25% by weight propylene, which is measured by the percentage of insoluble matter.

Four tests were carried out. The polymerization was effected in two 8-liter reactors, placed in series, with the use of the catalyst system $VOCl_3$—$Cl_3Al_2(C_2H_5)_3$. The monomers were introduced continuously into the first reactor under the conditions set forth in Table 2A below, while maintaining the rates of flow, expressed in liters/hour, constant. The polymer solutions obtained at the outlet of this first reactor were sent into a second reactor, also fed with reagents as indicated in Table 2A, and from the outlet of which the elastomers were recovered.

The polymers obtained at the outlets of the two reactors have the characteristics set forth in Table 2B.

It is noted that the products obtained at the outlet of the first reactor are elastomers of high molecular weight having a propylene content of between 26% and 32% (by weight) and a monomodal distribution of the molecular weights.

The elastomers obtained at the outlet of the second reactor have a wide bimodal distribution of the molecular weights and bimodal composition distribution as a function of the molecular weights. FIG. 2 shows the bimodal distribution of the molecular weights of the elastomer 3a.

The elastomers obtained have the characteristics set forth in Table 2C below.

From the terpolymers obtained at the outlet of the second reactor (Tests 2a, 3a, 4a) and from the terpolymer obtained at the outlet of the first reactor (Test 1), vulcanizable mixes were prepared in accordance with the same formulation as in Example 1.

The compromise between raw adhesive power and raw cohesion of these mixes is set forth in Table 2D below.

It is noted, on the one hand, that the raw adhesive power decreases when the quantity of insoluble matter in the elastomers increases and, on the other hand, that this raw adhesive power is improved when there is a wide bimodal distribution of the molecular weights (Mixes 2a, 3a, 4a Tables 2C and 2D).

EXAMPLE 3

The object of this example is to show that by using a catalytic system which makes it possible to obtain terpolymers in accordance with the invention without insoluble fractions (fractions having a propylene content of less than 25% by weight), a definite improvement is obtained in the compromise between the raw adhesive power and the raw cohesion of the unvulcanized mixes.

Two tests were carried out. The polymerization was effected, as in Example 2, in two reactors connected in series with the use of the catalytic system $VCl_4$-$Cl_3Al_2(C_2H_5)_3$-$CCl_3COOC_2H_5$. The rates of flow, expressed in liters per hour, were maintained constant. The following molar ratios were used: in the first reactor Al/V = 20, in the second reactor Al/V = 10, ($CCl_3COOC_2H_5$/V) = 5.

The other operating conditions are set forth in Table 3A below.

The polymers obtained at the outlets of the two reactors have the characteristics set forth in Tables 3B and 3C, below.

From these terpolymers, vulcanizable mixes were prepared in accordance with the same formulation as in Example 1.

The compromise between the raw adhesive power and the raw cohesion of these mixes is set forth in Table 3D, below.

There were constantly obtained terpolymers which provided mixes having an improved compromise between the raw adhesive power and raw cohesion due to the use of a catalytic system leading to terpolymers which are free of insoluble fractions.

EXAMPLE 4

The object of this example is to show the importance of the propylene content of the fraction of high molecular weight on the compromise between the raw cohesion and the raw adhesive power of the unvulcanized mixes.

Four tests were carried out using the procedure described in Example 3, but modifying the rates of flow so as to obtain:

polymers whose propylene content in the fractions of high molecular weight is less than 26% by weight (Tests 7 and 8), polymers in accordance with the invention (Test 9), polymers whose propylene content in the fractions of high molecular weight is greater than 32% by weight of propylene (Test 10).

The characteristics of the elastomers obtained are set forth in Table 4A below.

From these terpolymers there were prepared vulcanizable mixes in accordance with the same formulation as in Example 1. The raw properties of the mixes obtained are set forth in Table 4B below.

It will be noted that if the propylene content of the fractions of high molecular weight:

is less than 26% by weight, the mix has good raw cohesion but a poor raw adhesive power (Tests 7, 8);

is more than 32% by weight, the mix has a satisfactory raw adhesive power but a very low raw cohesion (Test 10).

These three tests (Tests 7, 8, 10), therefore, do not represent a good compromise between the raw adhesive power and the raw cohesion of the mixes, contrary to the mix in accordance with the invention (Test 9).

EXAMPLE 5

The object of this example is to show that the improved level of the compromise between the raw adhesive power and the raw cohesion of unvulcanized mixes prepared from the elastomers in accordance with the invention remains satisfactory when the relative proportions of the fractions of high and low molecular weight vary within certain limits. A series of three terpolymers in accordance with the invention were prepared by a conventional process.

The characteristics of the elastomers obtained are set forth in Table 5A, below.

Figure 3:
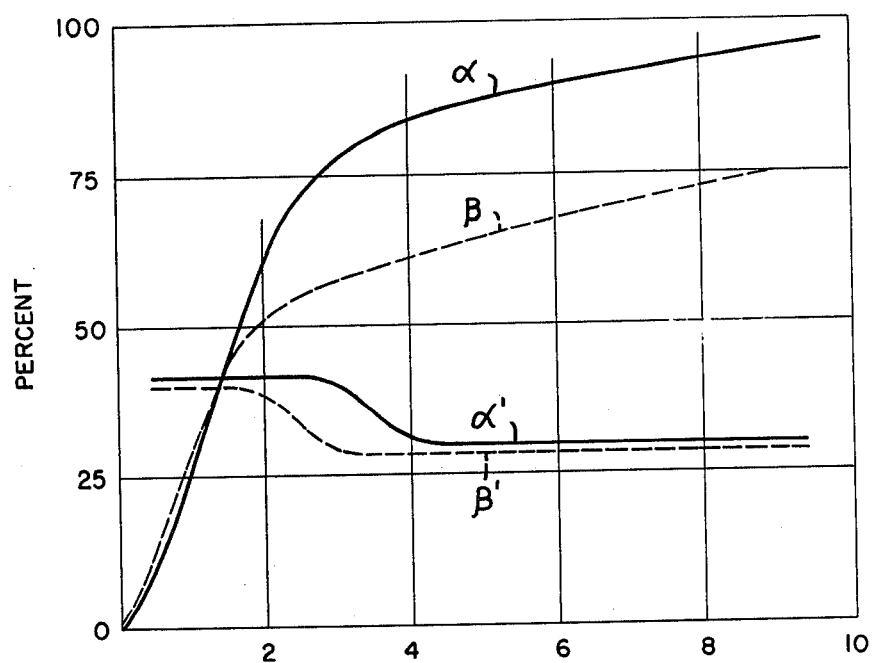

FIG. 3 shows on the ordinates, on the one hand, the cumulative weight (in %) of the different fractions of the polymers 11 (curve $\alpha$) and 13 (curve $\beta$) and, on the other hand, the propylene content of each fraction (polymers 11, curve $\alpha'$; polymer 13, curve $\beta'$) as a function of the intrinsic viscosities of each of the different fractions (on the abscissa).

From these elastomers, vulcanizable mixes were prepared in accordance with the same formulation as in Example 1. The characteristics of the vulcanizable mixes obtained are set forth in Table 5B below.

The mixes thus obtained are vulcanized at 160° C. for twenty minutes. The characteristics of these vulcanized mixes are set forth in Table 5C below.

With these elastomers, various parts were made which are included within the building of pneumatic tires. It was found that there was no problem of manufacture on an industrial scale of the various parts nor any problem in the storage or handling of these parts.

The still unvulcanized tires made from these elastomers did not show any deformation, separation or detachment of their various components upon storage before vulcanization.

It is obvious that one would not be going beyond the scope of the invention if one were to add an agent which improves the raw adhesive power or the raw cohesion of unvulcanized mixes of the elastomers.

The terpolymers in accordance with the invention can also be used advantageously in the preparation of any rubber articles such as, for instance, transmission belts, conveyor belts, reinforced flexible hoses, etc.

TABLE 2C

| Test No. | 1 | 2a | 3a | 4a |
|---|---|---|---|---|
| Total content by weight of propylene (%) | 31 | 39 | 37 | 35 |
| Content of propylene in fractions of high molecular weight (% by weight) | 31 | 29 | 29 | 27 |
| Content of propylene in fractions of low molecular weight (% by weight) | | 48 | 44 | 42 |
| Content of fractions of high molecular weight (% by weight of elastomers) | 100 | 53 | 50 | 44 |
| Inherent viscosity (dl/g) | 3.6 | 2 | 2.1 | 2.05 |
| Mooney ML (1+4) plasticity | 99 | 24 | 29 | 22 |

TABLE 1A

| Test No. | 1 | 2 | 3 | 4 | 5 | 6 | 7 |
|---|---|---|---|---|---|---|---|
| Heptane (solvent) | 16 | 16 | 16 | 16 | 16 | 16 | 16 |
| Ethylene | 200 | 250 | 300 | 250 | 250 | 300 | 250 |
| Propylene | 300 | 300 | 300 | 300 | 640 | 600 | 400 |
| Hexadiene-1,4 | 0.122 | 0.122 | 0.150 | 0.130 | 0.120 | 0.120 | 0.130 |
| VO $(OC_4H_9)_3$ (0.037 mol/l) | 0.081 | 0.081 | 0.081 | 0.052 | 0.042 | 0.042 | 0.028 |
| $Cl_3Al_2(C_2H_5)_3$ (0.037 mol/l) | 0.810 | 0.810 | 0.810 | 0.520 | 0.420 | 0.420 | 0.280 |
| Temperature (° C.) | 40 | 40 | 40 | 40 | 20 | 20 | 20 |
| Dwell time (minutes) | 30 | 30 | 30 | 30 | 30 | 30 | 30 |
| Concentration of the polymer (g/l) | 16 | 17.5 | 19 | 13 | 18 | 20 | 17 |

TABLE 1B

| Test No. | 1 | 2 | 3 | 4 | 5 | 6 | 7 |
|---|---|---|---|---|---|---|---|
| Overall composition, % by weight of propylene | 30 | 28 | 25 | 23 | 32 | 30 | 28 |
| Crystallization temp. (° C.) | 8 | 13 | 23 | 38 | 2 | 8 | 13 |
| Inherent viscosity (dl/g) | 1.62 | 1.75 | 1.95 | 2.30 | 3.54 | 4.25 | 3.77 |
| Mooney ML (1+4) plasticity at 130° C. | 17 | 22 | 40 | 87 | 102 | 129 | 110 |
| Iodine No. | 6 | 6.5 | 8 | 6.5 | 5 | 4.8 | 6.4 |

TABLE 1C

| Test No. | 1 | 2 | 3 | 4 | 5 | 6 | 7 |
|---|---|---|---|---|---|---|---|
| RAW COHESION | | | | | | | |
| Elongation force (100%) (g/mm$^2$) | 19 | 45 | 90 | 138 | 54 | 68 | 68 |
| Elongation force (500%) (g/mm$^2$) | 0 | 64 | 236 | 430 | 0 | 84 | 128 |
| Rupture force (g/mm$^2$) | 8 | 120 | 556 | 940 | 2 | — | 580 |
| Elongation at rupture (%) | 220 | 1500 | 1100 | 800 | 340 | >2000 | 1950 |
| RAW ADHESIVE POWER (g/cm$^2$) | 600 | 600 | 150 | 0 | 300 | 400 | 100 |

TABLE 2A

| | REACTOR 1 | | | | REACTOR 2 | | | |
|---|---|---|---|---|---|---|---|---|
| Test No. | 1 | 2 | 3 | 4 | 1a | 1a | 3a | 4a |
| Heptane (solvent) | 16 | 16 | 32 | 32 | solution of first reactor | | | |
| Ethylene | 400 | 400 | 450 | 450 | 200 | 200 | 200 | |
| Propylene | 700 | 700 | 850 | 850 | 200 | 200 | 200 | |
| Hexadiene-1,4 | 0.170 | 0.170 | 0.200 | 0.200 | | | | |
| VOCl$_3$ (0.04 mol/l) | 0.117 | 0.117 | 0.117 | 0.117 | | 0.117 | 0.117 | 0.117 |
| $Cl_3Al_2(C_2H_5)_3$ (0.110 mol/l) | 0.438 | 0.438 | 0.438 | 0.438 | | | | |
| $CCl_3COOC_2H_5$ (0.078 mol/l) | | | | | | 0.310 | 0.125 | 0.125 |
| Hydrogen | | | | | | 20 | 20 | 20 |
| Temperature (° C.) | 30 | 30 | 30 | 35 | | 30 | 30 | 35 |
| Pressure (kg/cm$^2$) | 6 | 6 | 6 | 6 | | 6 | 6 | 6 |
| Ratio Al/V | 20 | 20 | 20 | 20 | | 10 | 10 | 10 |
| Average dwell time (minutes) | 30 | 30 | 15 | 15 | | 30 | 15 | 15 |

TABLE 2B

| | REACTOR 1 | | | | REACTOR 2 | | | |
|---|---|---|---|---|---|---|---|---|
| Test No. | 1 | 2 | 3 | 4 | 1a | 2a | 3a | 4a |
| Concentration of the polymer (g/l) | 29 | 29 | 15 | 15 | | 55 | 30 | 34 |
| Composition of the polymer in propylene (% by weight) | 31 | 29 | 29 | 27 | | 39 | 37 | 35 |
| Mooney ML (1+4) plasticity at 130° C. | 99 | 80 | 100 | 101 | | 24 | 29 | 22 |
| Iodine number | 8.9 | 8.2 | 6 | 7.4 | | 9.6 | 6 | 6.4 |

TABLE 2C-continued

| Test No. | 1 | 2a | 3a | 4a |
|---|---|---|---|---|
| at 130° C. | | | | |
| Crystallization temp. (° C.) | 15 | 16 | 15 | 16 |
| Amount of insoluble matter (fractions having a propylene content of less than 25% by weight) (% by weight of elastomers) | 20.3 | 9.7 | 6.6 | 3.7 |

TABLE 2D

| Test No. | 1 | 2a | 3a | 4a |
|---|---|---|---|---|
| RAW COHESION | | | | |
| Elongation force (100%) (g/mm$^2$) | 79 | 12.5 | 18 | 13 |
| Elongation force (500%) (g/mm$^2$) | 122 | 22.5 | 39 | 25 |
| Rupture force (g/mm$^2$) | 142 | 25 | 36 | 35 |
| Elongation at rupture (%) | 1300 | 1600 | 2000 | 1900 |
| RAW ADHESIVE POWER (g/cm$^2$) | 180 | 800 | 1120 | 1520 |

TABLE 3A

| | REACTOR 1 | | REACTOR 2 | |
|---|---|---|---|---|
| Test No. | 5 | 6 | 5a | 6a |
| Heptane | 16 | 16 | solution of the first reactor | |
| Ethylene | 365 | 365 | 200 | 200 |
| Peropylene | 650 | 650 | 200 | 400 |
| Hexadiene-1,4 | 0.190 | 0.190 | | |
| VCl$_4$ (0.0615 mol/l) | 0.044 | 0.044 | 0.044 | 0.044 |
| Cl$_3$Al$_2$(C$_2$H$_5$)$_3$ (0.05 mol/l) | 0.538 | 0.538 | | |
| CCl$_3$COOC$_2$H$_5$ (0.0615 mol/l) | | | 0.220 | 0.220 |
| Hydrogen | | | 20 | 20 |
| Temperature (° C.) | 30 | 30 | 30 | 30 |
| Pressure (kg/cm$^2$) | 6 | 6 | 6 | 6 |
| Average dwell time (minutes) | 30 | 30 | 23 | 23 |

TABLE 3B

| | REACTOR 1 | | REACTOR 2 | |
|---|---|---|---|---|
| Test No. | 5 | 6 | 5a | 6a |
| Concentration of the polymer (g/l) | 24 | 25 | 58 | 58 |
| Composition of the polymer in propylene % by weight | 29 | 29 | 38 | 39 |
| Mooney ML (1+4) plasticity at 130° C. | 125 | 130 | 25 | 25 |

TABLE 3C

| Test No. | 5a | 6a |
|---|---|---|
| Total content by weight of propylene (%) | 38 | 39 |
| Content of propylene in fractions of high molecular weight (% by weight) | 29 | 29 |
| Content of propylene in fractions of low molecular weight (% by weight) | 43 | 45 |
| Content of fractions of high molecular weight (% by weight of elastomers) | 41 | 43 |
| Inherent viscosity (dl/g) | 2.1 | 2 |
| Amount of insoluble matter (%) | 0 | 0 |

TABLE 3D

| Test No. | 5a | 6a |
|---|---|---|
| RAW COHESION | | |
| Elongation force (100%) (g/mm$^2$) | 22 | 14 |
| Elongation force (500%) (g/mm$^2$) | 32 | 52 |
| Rupture force (g/mm$^2$) | 67 | 90 |
| Elongation at rupture (%) | 1950 | 1900 |
| RAW ADHESIVE POWER (g/cm$^2$) | 1650 | 1500 |

TABLE 4A

| Test No. | 7 | 8 | 9 | 10 |
|---|---|---|---|---|
| Total content by weight of propylene (%) | 34 | 32 | 35 | 42 |
| Content of propylene in fractions of high molecular weight (% by weight) | 25 | 26 | 27 | 34 |
| Content of propylene in fractions of low molecular weight (% by weight) | 45 | 40 | 43 | 46 |
| Content of fractions of high molecular weight (% by weight of elastomers) | 53 | 57 | 50 | 45 |
| Mooney ML (1+4) placticity at 130° C. | 32 | 35 | 28 | 37 |
| Amount of insoluble matter (%) | 1.4 | 1 | 2.5 | 0 |

TABLE 4B

| Test No. | 7 | 8 | 9 | 10 |
|---|---|---|---|---|
| RAW COHESION | | | | |
| Elongation force (100%) (g/mm$^2$) | 42 | 40 | 35 | 15 |
| Elongation force (500%) (g/mm$^2$) | 195 | 188 | 155 | 1.5 |
| Rupture force (g/mm$^2$) | 510 | 470 | 390 | 1.5 |
| Elongation at rupture (%) | 2200 | 1200 | 1100 | 700 |
| RAW ADHESIVE POWER (g/cm$^2$) | 760 | 800 | 1500 | 1850 |

TABLE 5A

| Test No. | 11 | 12 | 13 |
|---|---|---|---|
| Total content by weight of propylene (%) | 38 | 37 | 36 |
| Average intrinsic viscosity of the fractions of high molecular weight | 4.60 | 4.98 | 5.22 |
| Content of propylene in the fractions of high molecular weight (% by weight) | 29 | 29 | 28 |
| Content of fractions of high molecular weight (% by weight of elastomers) | 22 | 38 | 48 |
| Average intrinsic viscosity of the fractions of low molecular weight | 1.20 | 0.98 | 0.90 |
| Content of propylene in the fractions of low molecular weight (% by weight) | 40 | 41 | 42 |
| Content of fractions of low molecular weight (% by weight of elastomers) | 78 | 62 | 52 |
| Mooney ML (1+4) plasticity at 130° C. | 37 | 47 | 61 |
| Inherent viscosity (dl/g) | 2.60 | 2.9 | 3.53 |
| Amount of insoluble matter (%) | 0 | 0 | 0 |
| Crystallization temperature (° C.) | — | 10 | 8 |
| Iodine number | 10.3 | 11.2 | 9.3 |

In Test 12, the average number molecular weight of fractions of low molecular weight is 30,000 and that of high molecular weight is 553,000.

TABLE 5B

| Test No. | 11 | 12 | 13 |
|---|---|---|---|
| RAW COHESION | | | |
| Elongation force (100%) (g/mm$^2$) | 18 | 29 | 25 |
| Elongation force (500%) (g/mm$^2$) | 28 | 45 | 70 |
| Rupture force (g/mm$^2$) | 80 | 290 | 310 |
| Elongation at rupture (%) | 1900 | 1850 | 1700 |

TABLE 5B-continued

| Test No. | 11 | 12 | 13 |
|---|---|---|---|
| RAW ADHESIVE POWER (g/cm$^2$) | 1750 | 2650 | 2600 |

TABLE 5C

| Test No. | 11 | 12 | 13 |
|---|---|---|---|
| Modulus of elongation (100%) (kg/cm$^2$) | 11.5 | 12.75 | 12.2 |
| Hysteresis loss at 60° C. (%) | 27.4 | 26.8 | 20.6 |
| Scott breakage, rupture force (kg/cm$^2$) | 114 | 155 | 160 |
| Elongation at rupture (%) | 685 | 580 | 599 |
| ISO hardness | 53 | 58 | 53 |

What is claimed is:

1. Elastomers of the ethylene-propylene-termonomer type consisting essentially of
   (a) a first principal fraction of low molecular weight comprising from about 30% to about 85% by weight (referred to the total weight of elastomers) of molecular fractions having:
   an intrinsic viscosity distribution extending from about 0.2 to about 3,
   an average intrinsic viscosity between about 0.8 and about 1.5,
   an average propylene content of between about 36% and about 52% by weight, and
   a termonomer content of between about 0% and about 5% by weight;
   (b) a second principal fraction of high molecular weight comprising from about 70% to about 15% by weight (referred to the total weight of elastomers) of molecular fractions having:
   an intrinsic viscosity distribution extending from about 3 to about 15,
   an average intrinsic viscosity between about 3.5 and about 7,
   an average propylene content of between about 26% and about 32% by weight, and
   a termonomer content of between about 0% and about 5% by weight; and
   (c) less than about 5% by weight (referred to the total weight of elastomers) of molecular fractions having a propylene content of less than about 25% by weight and a crystallization temperature of more than 35° C.;
   said termonomer being a linear nonconjugated diene;
   said elastomers having a wide bimodal distribution of the molecular weights; and each of the two said principal fractions having
   a wide distribution of the molecular weights,
   a propylene and ethylene content which is different from that of the other principal fraction, and
   a distribution of propylene and ethylene which is very narrow (± 2%) around the average value contemplated for the fraction.

2. Elastomers according to claim 1 wherein the amount of molecular fractions having a propylene content of less than about 25% by weight is less than about 3% by weight (referred to the total weight of the elastomers).

3. Elastomers according to claim 1 wherein the termonomer is hexadiene-1,4.

4. Vulcanizable mixes having an improved compromise between their raw adhesive power and their raw cohesion comprising as the principal component elastomers according to claim 1.

5. Vulcanizable mixes according to claim 4 which are free of any adhesive or cohesion agent.

6. Unvulcanized rubber articles which are formed in whole or in part of elastomers according to claim 1.

7. Vulcanized rubber articles which are formed in whole or in part of elastomers according to claim 1.

* * * * *